United States Patent

Kowalkowski et al.

[11] Patent Number: 5,924,069
[45] Date of Patent: *Jul. 13, 1999

[54] VOICE-CONTROL INTEGRATED FIELD SUPPORT DATA COMMUNICATIONS SYSTEM FOR MAINTENANCE, REPAIR AND EMERGENCY SERVICES

[75] Inventors: Mark Anthony Kowalkowski, Naperville; Ronald Charles Koziel, Elk Grove Village; Robert Joseph Kuch, Bolingbrook; Varudiyam P. Shanmugham, Hanover Park, all of Ill.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/790,424

[22] Filed: Jan. 30, 1997

[51] Int. Cl.⁶ .................................................. G10L 9/06
[52] U.S. Cl. ............................................ 704/275; 704/270
[58] Field of Search ................................. 704/235, 270, 704/275

[56] References Cited

U.S. PATENT DOCUMENTS

| | | | |
|---|---|---|---|
| 4,856,072 | 8/1989 | Schneider et al. | 381/86 |
| 4,931,950 | 6/1990 | Isle et al. | 706/11 |
| 5,263,865 | 11/1993 | Zipf | 434/309 |
| 5,305,244 | 4/1994 | Newman et al. | 364/708.1 |
| 5,335,276 | 8/1994 | Thompson et al. | 380/21 |
| 5,335,313 | 8/1994 | Douglas | 704/275 |
| 5,416,730 | 5/1995 | Lookofsky | 364/708.1 |
| 5,420,912 | 5/1995 | Koop et al. | 455/563 |
| 5,441,047 | 8/1995 | David et al. | 600/483 |
| 5,442,728 | 8/1995 | Kaufman et al. | 704/270 |
| 5,465,401 | 11/1995 | Thompson | 455/558 |
| 5,544,649 | 8/1996 | David et al. | 600/301 |
| 5,592,586 | 1/1997 | Maitra et al. | 704/220 |
| 5,687,734 | 11/1997 | Dempsey et al. | 600/509 |
| 5,692,215 | 11/1997 | Kutzik et al. | 395/838 |
| 5,706,399 | 1/1998 | Bareis | 704/274 |

OTHER PUBLICATIONS

Portable Information Processing System; PIPS Business Development, Deer Park NY (Brochure) 1994.

*Primary Examiner*—David R. Hudspeth
*Assistant Examiner*—Tālivaldis Ivars Šmits

[57] ABSTRACT

A method and apparatus for assisting in the performance of maintenance, repair and emergency services. An integrated field support system is connectable to a customer support center. The integrated field support system comprises a portable platform (a computer), a group of peripheral devices, and a communications interface for accessing the customer support center. The field system allows field personnel to receive displays of documentation, graphics and other pictorial displays, and to issue commands orally for interpretation by a speech recognition unit. The connection to the customer support center provides personnel in that center with all data available to the field personnel and vice versa. Advantageously, this method and apparatus allow field personnel to receive the information they need to perform their tasks in an optimal fashion.

11 Claims, 2 Drawing Sheets

VOICE-CONTROL INTEGRATED FIELD SUPPORT DATA COMMUNICATIONS SYSTEM FOR MAINTENANCE, REPAIR AND EMERGENCY SERVICES

TECHNICAL FIELD

This invention relates to arrangements for assisting maintenance, installation and repair craft in their duties.

PROBLEM

Telecommunication and distributed processing systems are becoming increasingly complex and analysis of problems in such systems is becoming increasingly difficult. The maintenance, repair and installation craft responsible for keeping such systems running need all the help that they can get. This is especially true for craft that work for a service company that services many different systems for different companies. A problem of the prior art is that such help still appears to be inadequate or only marginally adequate.

SOLUTION

The above problem is significantly alleviated and an advance is made over the teachings of the prior art in accordance with our invention which comprises a total training, support documentation, and interactive support system accessible by maintenance craft in the field. In accordance with one specific implementation of our invention, a maintenance, repair or installation crafts person is equipped with a portable platform which has access via a wireless link, an infrared link or a wired connection, to an interface; the interface is connected via a wireless or wired connection via the public telecommunications network to a support center. The portable platform also has access to a bulk memory such as a hard disk for storing a base amount of information. The maintenance craftsperson receives input in the form of a multimedia display which may include the display of still pictures, text, or the display of video and/or audio. The platform has an audio interface for driving an earphone or speaker to receive spoken input from the interface and to transmit spoken input received at a microphone. The microphone is also connected to a speech recognition system having an input to the platform and used to command the platform and to supply data for populating documents generated by the platform; advantageously, no keyboard is required so that the maintenance craftsperson can have his or her hands available for the details of the repair. The platform is also connectable to a video camera to allow visual on-site data to be transmitted to the outside and to be displayed or recorded on the local or remote disk, for subsequent further study. The platform is also connectable to an infra-red electronic camera so that infra-red images can be detected and compared with previously recorded images. One or more hazard detectors (gas, radioactivity) can also be connected to the platform. The platform can also be connected to an office operational control center to receive alarm and status information. The PC will be loaded with software to display the tool inputs in a summarized form, including data visualization displays. Advantageously, this type of arrangement, referred to hereinafter as an integrated field system, provides the maintenance crafts person with the most sophisticated combination of tools available to help in the repair, installation or emergency situation. Advantageously, a craftsperson who has not visited a site before can become readily familiar with the site through prestored video images, such as a floor plan, and audio messages.

In accordance with one specific implementation, the video display available to the maintenance craftsperson is a display that is directly in front of one eye of the maintenance craftsperson. Advantageously, such a display requires a reduced number of pictorial elements (pixels) composed to a typical full-sized display, thus limiting the amount of information required to control the display.

In accordance with one embodiment, the support center is equipped with a support platform, an audio interface, a video monitor and camera, and a large data base. Signals from the support platform can be used to guide the maintenance craftsperson.

Advantageously, with this arrangement, the training environment can be arranged to closely resemble the working environment. The video signals supplied to the trainee can be the video signals representing the appearance of the equipment, as well as the video signals representing the results of requests by the trainee. The trainer supplies the information and data normally supplied by the support center.

DETAILED DESCRIPTION

Figure 1:
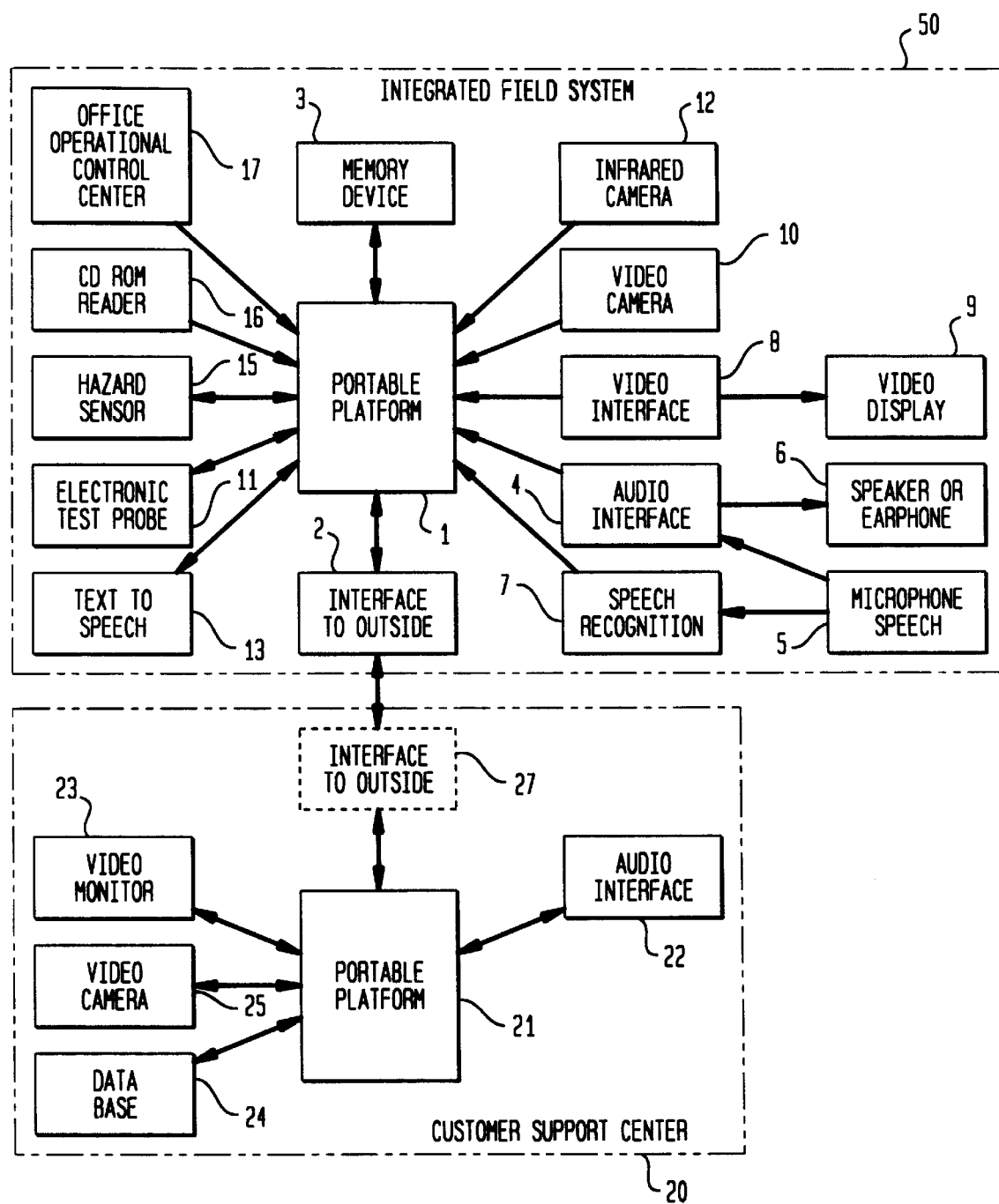
FIG. 1 is a block diagram of equipment for use by field support craft and by support center craft.

FIG. 1 is a block diagram showing the elements of the integrated field system 50 provided to a maintenance crafts person, and of a customer support center 20, to support the field. The central element is a portable platform 1 for driving the other units and receiving information from these units. In addition, the portable platform performs calculations and analysis of input signals from an electronic probe 11. In applicants' preferred embodiment, the portable platform is a portable computer such as an IBM compatible 80486, typically equipped with 4 megabytes of RAM.

Connected to the portable platform is an interface 2 for receiving communications input from outside, usually a support center or another integrated field system as part of a collaborative system to connect the person and platform most useful for solving a particular problem. Preferably, the interface is connected to the platform by a wireless or infrared connection is wireless so that the maintenance crafts person is not restricted in movement. In some circumstances, for example, when transmission of RF signals or infrared signals is prohibited, the maintenance crafts person is tethered to the interface. The interface is connected to a port of the telecommunications network. The connection between the customer support center and interface 2 is preferably via the public telecommunications network, land-based or wireless, but can also be a direct or private connection. The interface 2 is used to access additional information not stored in the memory device 3 or CD ROM and as a connection to field support personnel and their integrated field system 20. The support center, in turn, is connectable to a design center for bringing in specialized experts. Because of the limited bandwidth of most telecommunications channels, the amount of data to be sent for each interaction should be small, typically limited to about 50 kilobits.

The portable platform can be loaded by a moderate capacity memory device 3 (typically, a 100 megabyte disk) and/or by a CD ROM via a reader 16. The memory device is loaded from the interface 2, or from some other source such as one or more EEPROM (Flash®) or EPROM cards before the maintenance craftsperson begins work on a particular problem. The portable platform 1 is connected to an audio interface 4 for driving an earphone or speaker 6 from signals received by the platform or for sending signals via the interface to the outside, the signals being received from microphone 5. Microphone 5 is also connected to a speech recognition unit 7 which transmits data representing recognized speech to the platform. The data representing recognized speech is used as the command input to the portable PC, and can also be used to provide data to populate forms and documents related to the field task and generated by the platform or the customer support center. The data representing recognized speech may be used, for example, to request additional data, a request to which the platform responds by issuing commands sent as data messages to the interface to the support center 20 and to which the support center responds with the appropriate requested data.

The platform 1 is also connected to a video interface 8 for controlling a video display 9. Since the data rates supported by the wireless or wired connection are generally limited to about 64 kilobits per second, the video display is usually limited to slow motion video, especially if data is also being received in real time. On the other hand, data that is stored in the memory device 3 or on a CD ROM reader 16 can drive a faster motion video. The video display can be used, for example, to provide details on how a specific repair such as the splicing of two optical fibers can be performed. The platform is also connected to an electronic probe 11 for receiving electrical and/or optical signals; the platform analyzes and displays these signals on the video monitor utilizing data visualization processing.

A video camera 10 is used in some circumstances to transmit information to the support center or to record information for later analysis when the maintenance craftsperson has reason to believe that something is wrong with the equipment and that the problem includes symptoms that are visually apparent.

An electronic infra-red camera 12 is also connected for capturing a present infra-red picture of a piece of equipment (such as a backplane) for possible comparison with a stored baseline version. The information received by the video camera, probe, infra-red camera can be buffered by the portable platform 1 and transmitted to the support center 20, where it can be displayed and/or further analyzed.

The integrated field system 50 also includes a text to speech processing system 13 to generate announcements or commands based on recorded text. It also includes a danger sensor 15 for detecting high levels of radioactivity or other radiation, poisonous or explosive gases or other dangers in the environment. The field platform is also connectable to an office operations control center 17 from which it can receive alarm and status information of the work site where the craft is providing service and to which it can apply control signals.

The support center includes a support platform 21, a computer which, being permanently based, can be a more powerful computer than portable platform 1; an extensive data base 24 for storing information about the system, including accumulated trouble records; a video camera 25 for passing on to the craft any information recorded only on paper, and for showing the field craft other visual information available at the support center; a video monitor 23 to display any visual information captured by the field craft; an audio interface 22 for audio communications; and an interface 27 for communicating with integrated field systems 50 and with other support centers 20. The basic objective is to give the support center staff access to all information sources available to the field personnel.

Figure 2:
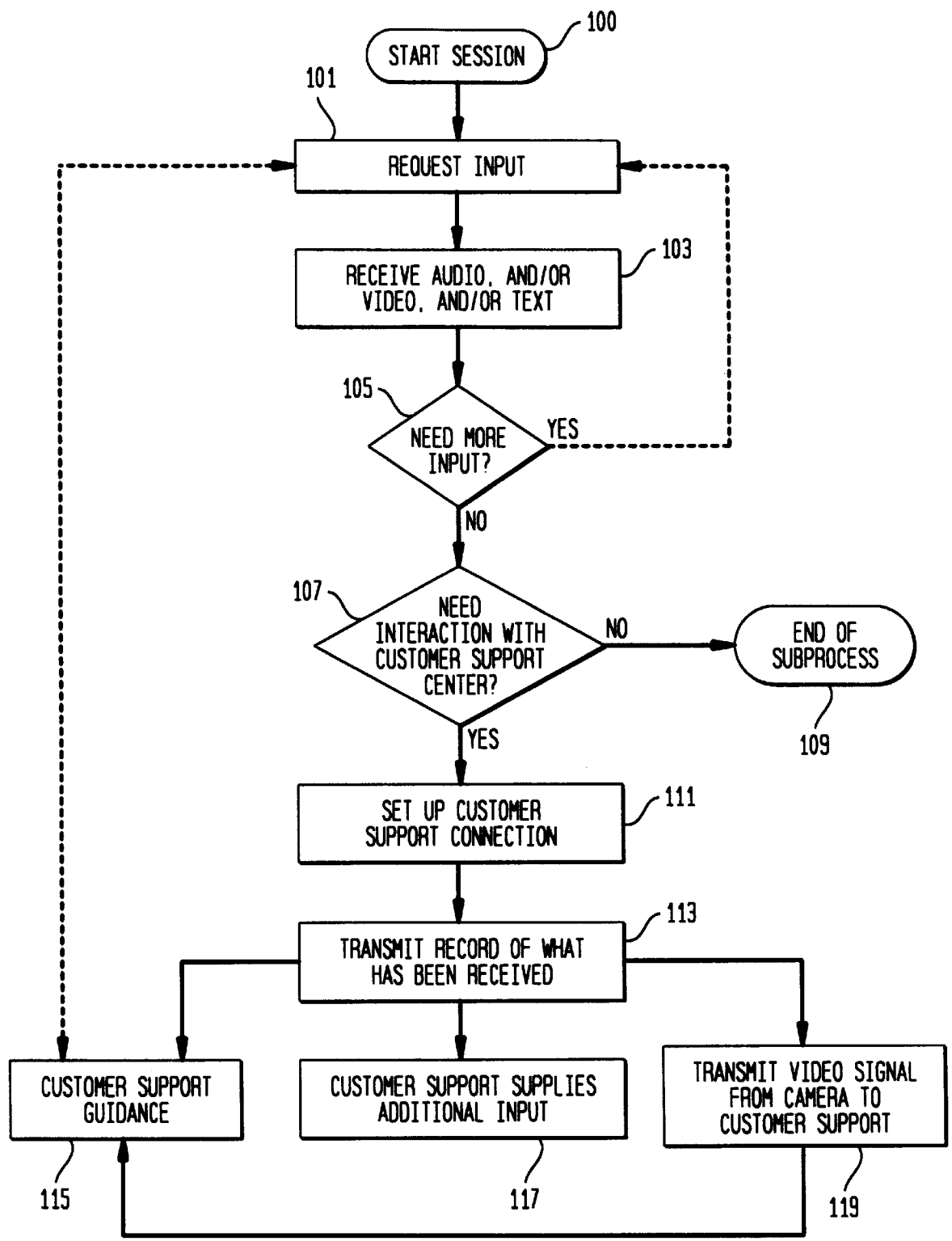
FIG. 2 is a flow diagram illustrating a process for utilizing the equipment shown in FIG. 1.

FIG. 2 is a flow chart representing a method by which the maintenance craft can use the facilities described in FIG. 1. The maintenance craft begins a session (block 100), if necessary or desirable, by loading appropriate data into the memory device. If a source for this data is locally available, that source is used. Otherwise, an initial period of receiving input from the support center is required in order to load the memory device. The input can be received over a conventional data connection or over the Internet or an equivalent facility. The maintenance craftsperson then requests some input by issuing an oral command (action block 101). In response to this command, the maintenance craftsperson receives (action block 103) audio and/or video and/or text either from the memory device or from the support center through the wireless or wired connection. This information is displayed in the video display or is received as audio from the speaker or earphone. The maintenance craftsperson then decides whether more input is needed (test 105). If so, then action block 101 is re-entered. If not, the maintenance craftsperson decides whether an interaction with field support is needed (test 107). If not, this is the end of the session (block 109).

If interaction with field support is required, then the maintenance craft issues a command to set up a field support connection (action block 111). This is done by issuing an oral command recognized by the speech recognition unit 7 and transmitted to the portable platform 1, which responds by establishing a connection to the customer support center via the interface 2 to the outside and via a telecommunications connection over the telecommunications network or, alternatively, by an Internet connection. When this connection has been established, the portable platform transmits a record of what has been received by the maintenance craftsperson (action block 113) so that the customer support personnel know what the maintenance craftsperson has already discovered. In response, the customer support people may supply oral guidance (action block 115) in response to which the maintenance personnel may request further input (action block 101). Alternatively, the customer support office may supply the additional input directly (action block 117), after which the maintenance craftsperson could either continue to be in oral communication with the customer support personnel or effectively could enter action block 103. The field support personnel may request the maintenance craftsperson to transmit a video signal (action block 119) from the video camera or the infra-red camera to the field support personnel if either party suspects that something is wrong which a visual inspection would help to clarify.

If necessary or desirable, a connection to other field force personnel or a backup to the customer support personnel can be added to or substituted for the customer support connection. The basic objective is to allow anyone who might be able to help solve a problem to receive all the information available to the local maintenance craftsperson.

The integrated field system of FIG. 1 is also an excellent training vehicle since simulated conditions can be supplied to a trainee on the video display 9 or via the speaker or earphone 6. The trainee can then request information in the same way as the trainee would make such a request under field conditions. The training session can be readily recorded to allow the trainees actions to be analyzed by the trainee or a trainer.

In summary, the combination of an Integrated Field System under the control of field personnel, interaction with a customer support center under the control of customer support personnel provides just in time and just enough current knowledge to permit the field personnel to perform their daily and emergency tasks in an operational fashion.

Many variations to the apparatus and method of applicants' invention can be made by those of ordinary skill in the art. The scope of the invention is therfore only limited by claims.

We claim:

1. In combination, apparatus for assisting craft to maintain, install or repair equipment, comprising:

bulk memory means for storing data to assist said craft;

an audio interface for receiving speech from said craft and for playing audio signals to said craft;

said audio interface connected to a speech recognition unit for converting speech signals received from said audio interface into command data;

computer means connected to said speech recognition means for executing commands represented by said command data, and for accessing said bulk memory means;

video display means connected to said computer means for displaying video data from said computer means to said craft;

telecommunications interface means for transmitting data, video and audio signals from said computer means to a support center, and for receiving data, video and audio signals from said support center; and video detection means for generating video signals for transmission via said telecommunications interface means to said support center;

wherein said video display receives video signals received from said telecommunications interface and said audio interface receives and transmits audio signals to said telecommunications interface;

an electronic probe connected to said computer means for receiving local signals indicative of a current state of said equipment for recording and analysis by said computer means;

said computer means for further processing inputs from said audio interface, said video detection means and said electronic probe to provide an integrated video and audio display representing current conditions of said equipment, said display providing just enough current status data to permit field craft to perform their daily and emergency tasks in an operational fashion.

2. The apparatus of claim 1 wherein said video detection means is connected to said computer means for controlling said video display means and for analyzing output signals of said video detection means.

3. The apparatus of claim 1 wherein said telecommunications interface means is further connectable to other field sites and to a backup of said support center for allowing consultation with other backup personnel.

4. The apparatus of claim 1 further comprising a text to speech converter for generating speech signals for use by said craft.

5. The apparatus of claim 1 further comprising a CD ROM reader for supplying video and bulk text to said computer means for display to said craft.

6. The apparatus of claim of claim 1 further comprising danger sensor means for detecting dangerous conditions and reporting such conditions to said computer means.

7. The apparatus of claim 1 wherein said speech recognition unit further converts speech signals into data for populating documents.

8. The apparatus of claim 1 further comprising means for accessing data from an office operational center.

9. The apparatus of claim 8, wherein said data from said office operational center comprises office alarm and status data.

10. The apparatus of claim 1, wherein said probe is further for receiving signals indicative of a current environmental state which may impact performance of said equipment.

11. The apparatus of claim 1, wherein said signals comprise signals indicative of at least one of temperature and radiation.

* * * * *